US009303683B1

(12) United States Patent
Newcomb, Jr. et al.

(10) Patent No.: US 9,303,683 B1
(45) Date of Patent: Apr. 5, 2016

(54) DETACHABLE CONNECTOR SYSTEM FOR MULTI-PANEL STRUCTURE

(71) Applicants: Leonard Ray Newcomb, Jr., Phoenix, AZ (US); Edward Seal, Reseda, CA (US)

(72) Inventors: Leonard Ray Newcomb, Jr., Phoenix, AZ (US); Edward Seal, Reseda, CA (US)

( * ) Notice: Subject to any disclaimer, the term of this patent is extended or adjusted under 35 U.S.C. 154(b) by 28 days.

(21) Appl. No.: 13/886,097

(22) Filed: May 2, 2013

Related U.S. Application Data

(60) Provisional application No. 61/652,180, filed on May 26, 2012.

(51) Int. Cl.
*E06B 3/48* (2006.01)
*F16C 11/00* (2006.01)
*E04B 1/343* (2006.01)

(52) U.S. Cl.
CPC .............. *F16C 11/00* (2013.01); *E04B 1/34321* (2013.01)

(58) Field of Classification Search
CPC ....... E04B 1/34321; F16C 11/00; F16C 11/04; F16C 11/12
USPC ........... 160/205, 200, 113, 229.1, 201, 368.1, 160/185, 97
See application file for complete search history.

(56) References Cited

U.S. PATENT DOCUMENTS

| | | | | | |
|---|---|---|---|---|---|
| 903,685 | A | * | 11/1908 | De Canio | 292/205 |
| 1,873,485 | A | * | 8/1932 | Rowe | 292/37 |
| 1,949,805 | A | * | 3/1934 | McGary et al. | 16/96 R |
| 2,039,296 | A | * | 5/1936 | Collins | 160/191 |
| 2,580,584 | A | * | 1/1952 | Nowak | E05B 65/0021 292/26 |
| 3,683,652 | A | * | 8/1972 | Halopoff et al. | 70/467 |
| 4,080,757 | A | * | 3/1978 | Westerman | E05B 65/0021 292/166 |
| 5,489,130 | A | * | 2/1996 | Clark | E05B 65/0021 292/66 |
| 5,498,041 | A | * | 3/1996 | Bezzerides et al. | 292/225 |
| 5,727,614 | A | * | 3/1998 | Lichy | 160/201 |
| 6,006,560 | A | * | 12/1999 | DeVries | E05B 53/003 292/38 |
| 6,058,747 | A | * | 5/2000 | Doyle et al. | 70/137 |
| 6,092,580 | A | * | 7/2000 | Lucas | 160/113 |
| 6,315,027 | B1 | * | 11/2001 | Lichy | 160/205 |
| 6,557,614 | B1 | * | 5/2003 | Lampers | 160/113 |
| 6,615,898 | B2 | * | 9/2003 | Schulte | 160/201 |
| 7,308,926 | B1 | * | 12/2007 | Hawkins | 160/113 |
| 7,469,737 | B2 | * | 12/2008 | Mullet et al. | 160/201 |
| 7,726,378 | B1 | * | 6/2010 | Savon | 160/201 |
| 7,775,252 | B2 | * | 8/2010 | Snyder et al. | 160/113 |
| 7,883,124 | B2 | * | 2/2011 | Gephart et al. | 292/210 |
| 7,891,400 | B2 | * | 2/2011 | Meichtry | E05D 15/165 160/205 |
| 8,453,705 | B2 | * | 6/2013 | Miller et al. | 160/113 |
| 8,893,764 | B2 | * | 11/2014 | Mascari et al. | 160/201 |
| 2002/0109359 | A1 | * | 8/2002 | Nodorft | 292/137 |

(Continued)

*Primary Examiner* — Katherine Mitchell
*Assistant Examiner* — Johnnie A Shablack
(74) *Attorney, Agent, or Firm* — Plager Schack LLP

(57) ABSTRACT

A connector system is provided suitable for use in disconnecting a pair of pivotally connected panels in a multi-panel structure when the connector system is applied to the multi-panel structure. The connector system has a plurality of first connectors having first and second members, with the first member affixable to a first panel and the second member affixable to a second panel, the first and second members of the first connectors comprising at least two openings to permit passage therethrough of a pin that, when in place, permits relative pivotal movement of the first and second panels when the first and second members are connected to the first and second panels, where the first connectors may be easily detached upon actuation of an actuator by a user to remove the pin from the openings. The actuator may be manually and/or automatically operated.

17 Claims, 12 Drawing Sheets

(56) References Cited

U.S. PATENT DOCUMENTS

| | | |
|---|---|---|
| 2003/0205340 A1 | 11/2003 | Nadar |
| 2005/0017516 A1* | 1/2005 | Finardi ............... E05B 65/0021 292/137 |
| 2005/0284586 A1 | 12/2005 | Mullet et al. |
| 2007/0200362 A1* | 8/2007 | Bacco et al. .................. 292/218 |
| 2007/0251654 A1 | 11/2007 | Liu |
| 2009/0044917 A1* | 2/2009 | Meichtry ...................... 160/201 |
| 2010/0050529 A1 | 3/2010 | Manser |
| 2010/0088961 A1* | 4/2010 | Roten ................... E05D 7/1005 49/209 |
| 2012/0199296 A1* | 8/2012 | Brunette et al. .............. 160/133 |

* cited by examiner

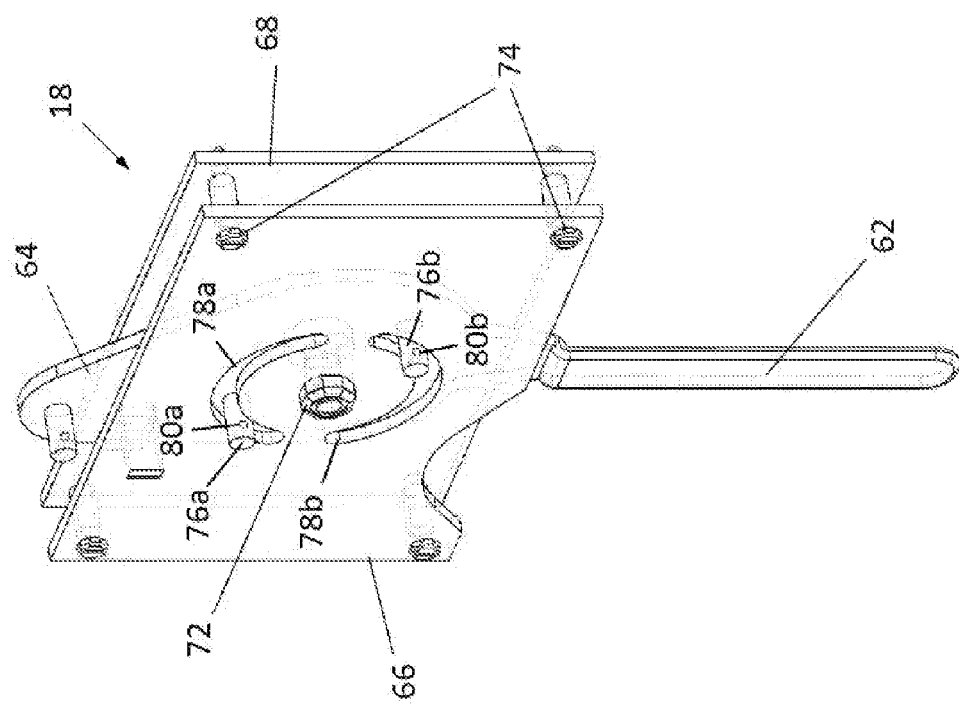

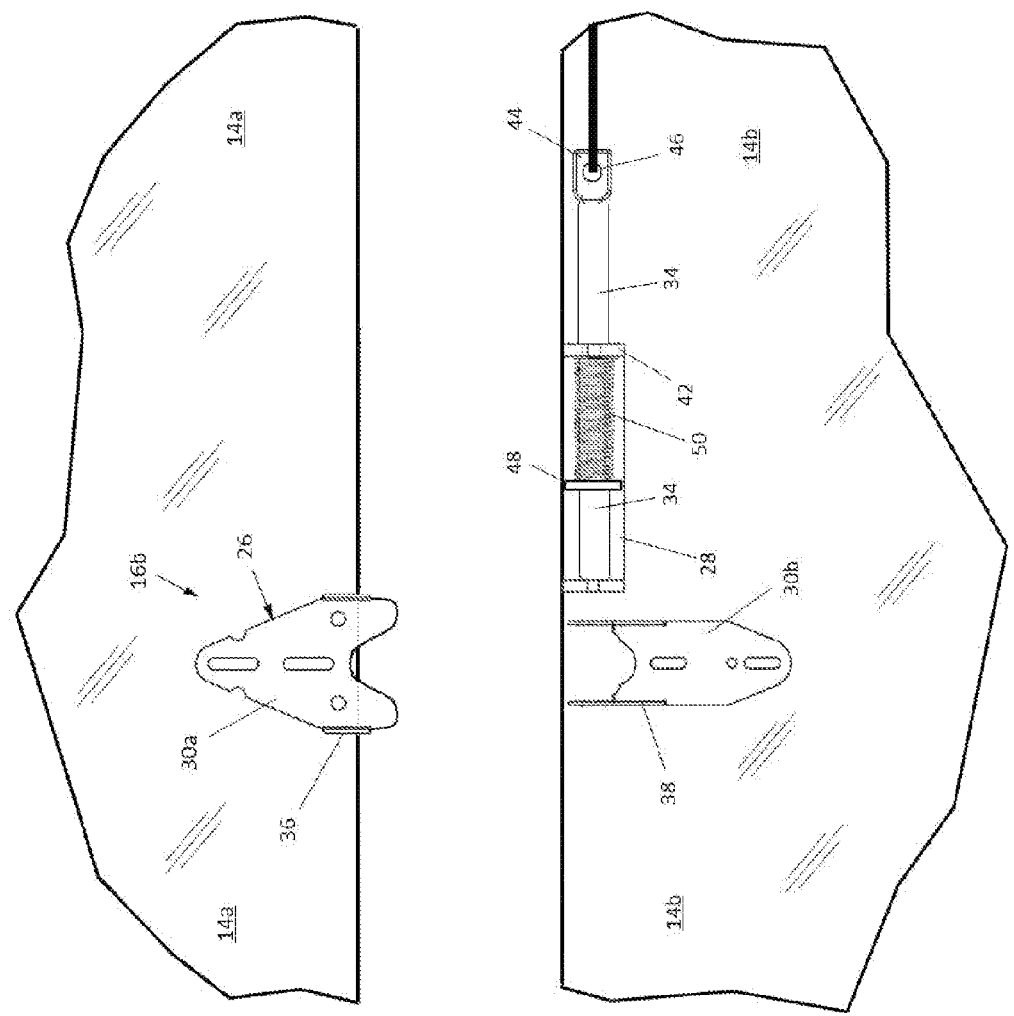

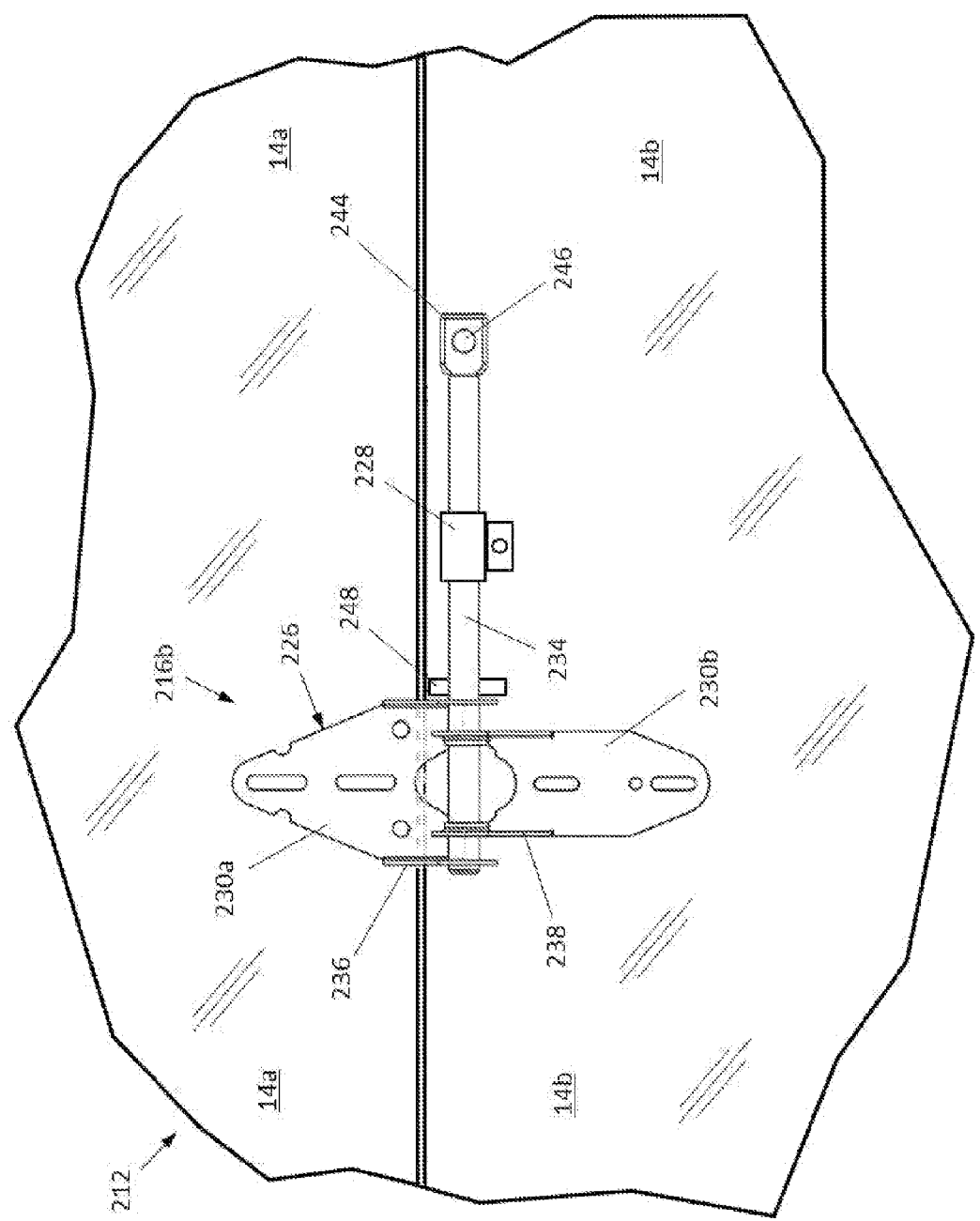

DETACHABLE CONNECTOR SYSTEM FOR MULTI-PANEL STRUCTURE

RELATED APPLICATION

This application claims priority to provisional patent application U.S. Ser. No. 61/652,180 filed on May 26, 2012, the entire contents of which is herein incorporated by reference.

BACKGROUND

The embodiments herein relate generally to detachable connectors for use with multi-panel structures to permit manual and automated separation of at least one pair of panels as desired by the user. One example of such a multi-panel structure is a garage door, comprising typically four or more panels pivotally connector together by a series of hinges that permit each panel to pivot relative to its adjacent panel(s).

SUMMARY

A connector system is provided that is configured for use with a multi-panel structure. The connector system comprises a plurality of first connectors having first and second members, where each first member of the plurality of first connectors is configured for affixation to one end of a first panel in the multi-panel structure, and where each second member of the plurality of first connectors is configured for affixation to one end of a second panel that is configured to be positioned adjacent to the one end of the first panel when the multi-panel structure is in use. In one embodiment, the first connectors comprise a pin to pivotally connect the first and second members, where the pin may supported by a bracket so that it may be controllably moved axially within holes or passages within the first and second members to attach and detach the first and second members as desired.

Actuation of the pin in a forward and rearward direction to attain attachment or detachment may be performed by an actuator that is manually operable and/or automatically operated via one or more of a number of automated systems. In some embodiments of the connector system, the first connectors comprise a spring-biased pin so that the pin may be pulled in one actual direction for detachment of the first and second members and then the pin may be released to return to its attached position via the force of the spring. By alternatingly attaching and detaching the first and second members of the first connectors through movement of the pin, the adjacent panels to which the first and second members are affixed may be separated. The actuator may be actuated mechanically, electro-mechanically, magnetically or via any other of a number of ways of applying motive forces, where such motive forces may be controlled locally or remotely via, for example, RF signals, or blue tooth signals, or the like.

In one arrangement, an actuator is configured to be mounted to either one of the first or second panels, and is linked to the pin used in association with the first connectors, whereby actuation of the actuator causes detachment of the first and second members of the first connectors thereby permitting separation of the first panel from the second panel when the connector system is applied to the multi-panel structure. In one embodiment, the connector system may comprise a plurality of second connectors having first and second members, where each first member of the plurality of second connectors being configured for affixation to one end of a third panel in a multi-panel structure, and where each second member of the plurality of second connectors being configured for affixation to another end of the second panel when in use. The second connectors preferably comprise at least one pin permitting relative pivotal movement of the adjacent second and third panels during normal use when the connector system is applied to the multi-panel structure, with the second connectors preferably remaining attached during normal use.

A multi-panel structure kit is provided that comprises in one embodiment one of the connector systems as described herein. In that regard, the connector systems may comprise just the first connectors, or they may comprise the first and second connectors, or pluralities of each. The kit may further comprise first and second panels each configured to accept affixation of the first and second members of the first connector of the connector system, respectively, and wherein one or both of the first and second panels is configured to accept affixation of the actuator. In this way, the kit may be sold with just the first and/or second connectors, or it may be sold along with panels to which the connectors may be affixed.

In some embodiments, a complete multi-panel structure assembly is provided comprising the components of the multi-panel structure kits described herein. In one example, the connector system is affixed to the first and second panels to permit detachable pivotable movement of the first and second panels when adjoined together using the first connector of the connector system. In another example, wherein the connector system is affixed to the first, second and third panels to permit detachable pivotable movement of the first and second panels when adjoined together using the first connector of the connector system and to permit non-detachable pivotable movement of the second and third panels when adjoined together using the second connector of the connector system.

BRIEF DESCRIPTION OF THE FIGURES

The detailed description of some embodiments of the invention will be made below with reference to the accompanying figures, wherein like numerals represent corresponding parts of the figures.

FIGS. 3A and 3B show a schematic perspective view of one embodiment of an actuator, with FIG. 3B showing the components in exploded view;

FIGS. 4B and 4C show the embodiment of FIG. 4A connected to a portion of one example of an actuator, with FIG. 4C showing the resulting separation of the first and second panels when the first connector is detached by the actuator;

FIG. 7A shows an elevational view of an alternative embodiment of a detachable connector of an alternative connector system as applied to a multi-panel structure;

DETAILED DESCRIPTION OF CERTAIN EMBODIMENTS

Figure 1A:
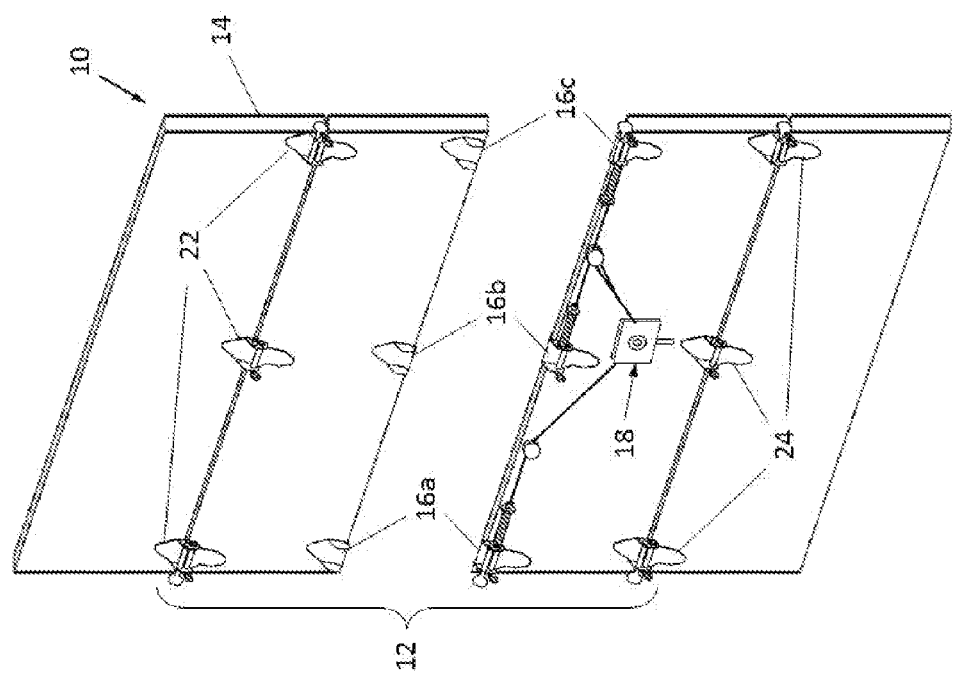
FIGS. 1A and 1B show a schematic perspective view of one embodiment of a detachable multi-panel system, where the system is shown in a closed and open mode.
Figure 1B:
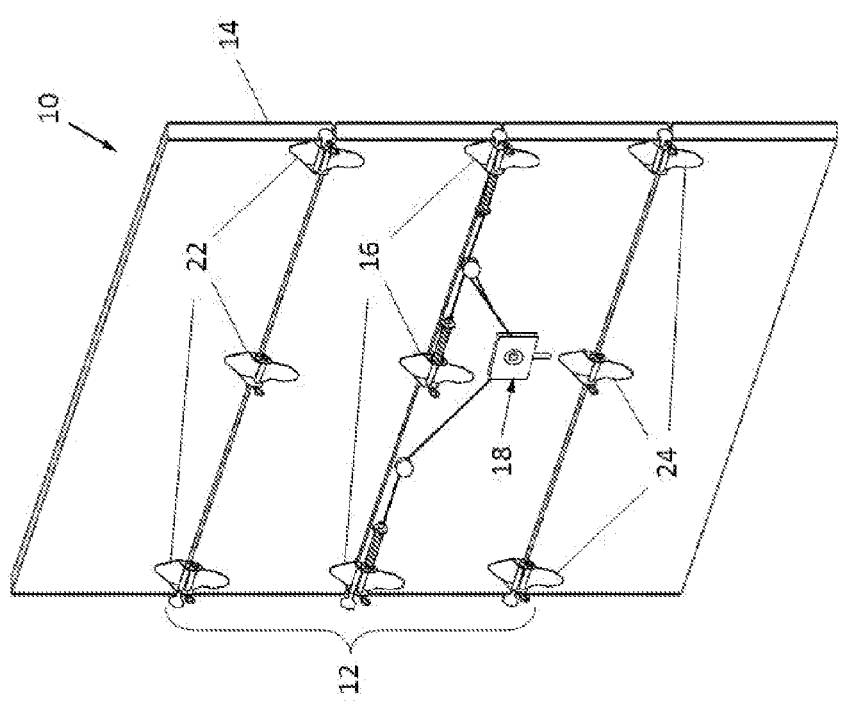

By way of example, and referring to FIGS. 1A and 1B, one embodiment of the present system comprises a multi-panel structure 10 comprising a plurality of connectors 12 applied to a plurality of panels 14. In one such example, connectors 12 comprises a plurality of detachable connectors 16 actuatable by actuator 18 secured to one panel of the multi-panel structure 10. The connectors 12 further comprises, at least in this embodiment, one or more sets of non-detachable connectors, such as those shown number 22 and 24. In the arrangement as presented in FIG. 1A, by example only, the detachable connectors 16a, 16b, 16c may be each simultaneously (or individually in other embodiments) detached via actuator 18 permitting separation of at least the two adjoining panels to which the detachable connectors 16a, 16b, 16c are affixed.

By way of example only, one embodiment of a first detachable connector 16a may be described in more detail with reference to FIGS. 2A and 2B. In that regard, connector 16a comprises a hinge 26 and a pin support bracket 28. In one embodiment, the hinge 26 comprises a first member 30a and a second member 30b secured to each other via pin 34 passing through openings in first member brackets 36 and second member brackets 38. With this arrangement, the first and second members 30a, 30b of hinge 26 may move pivotally relative to each other. The pin support bracket 28 may comprise ends 42 having openings therein through which the pin may pass as well.

Figure 2A:
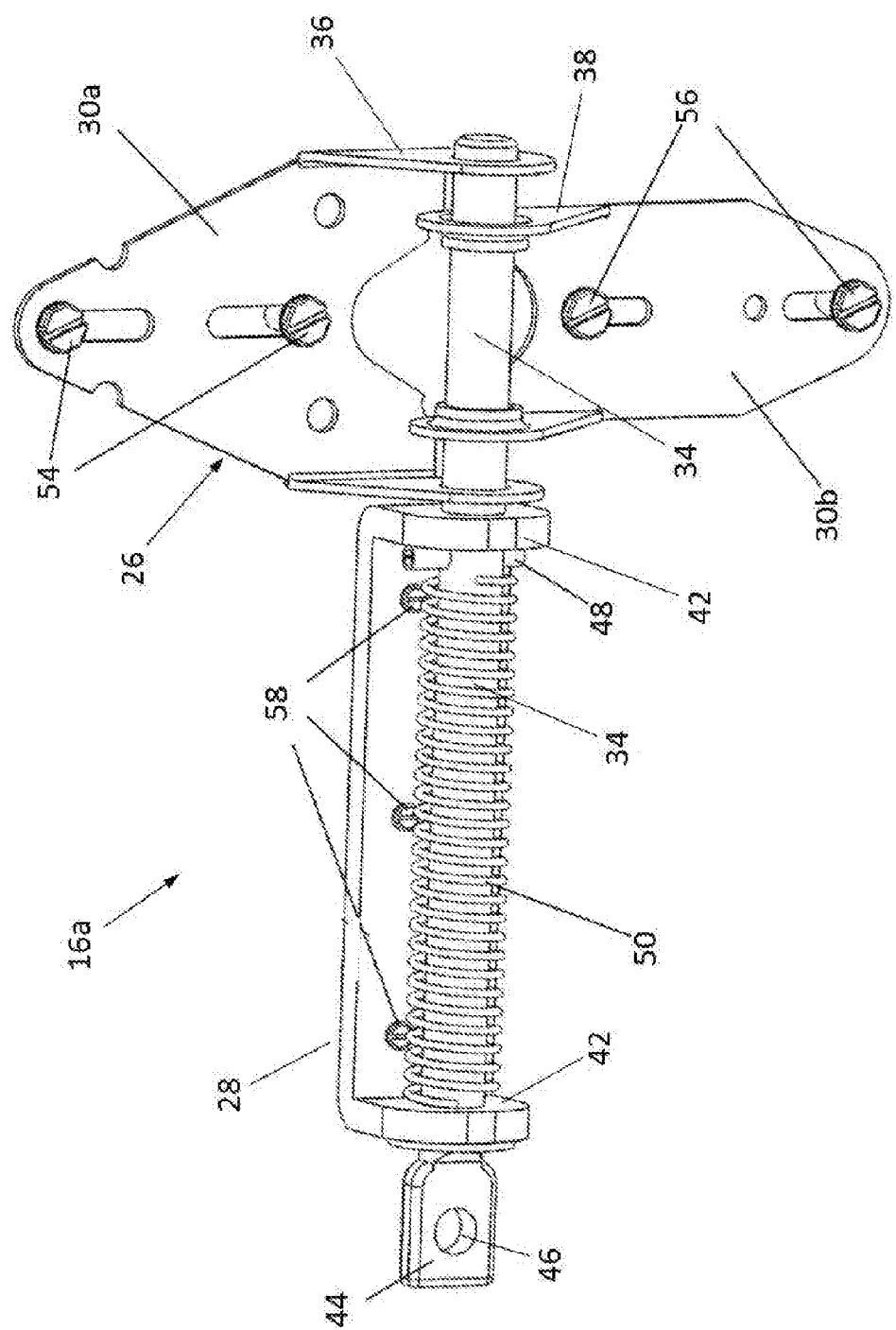
FIGS. 2A and 2B show a schematic perspective view of one embodiment of a first detachable connector, with FIG. 2B showing the components in exploded view.
Figure 2B:
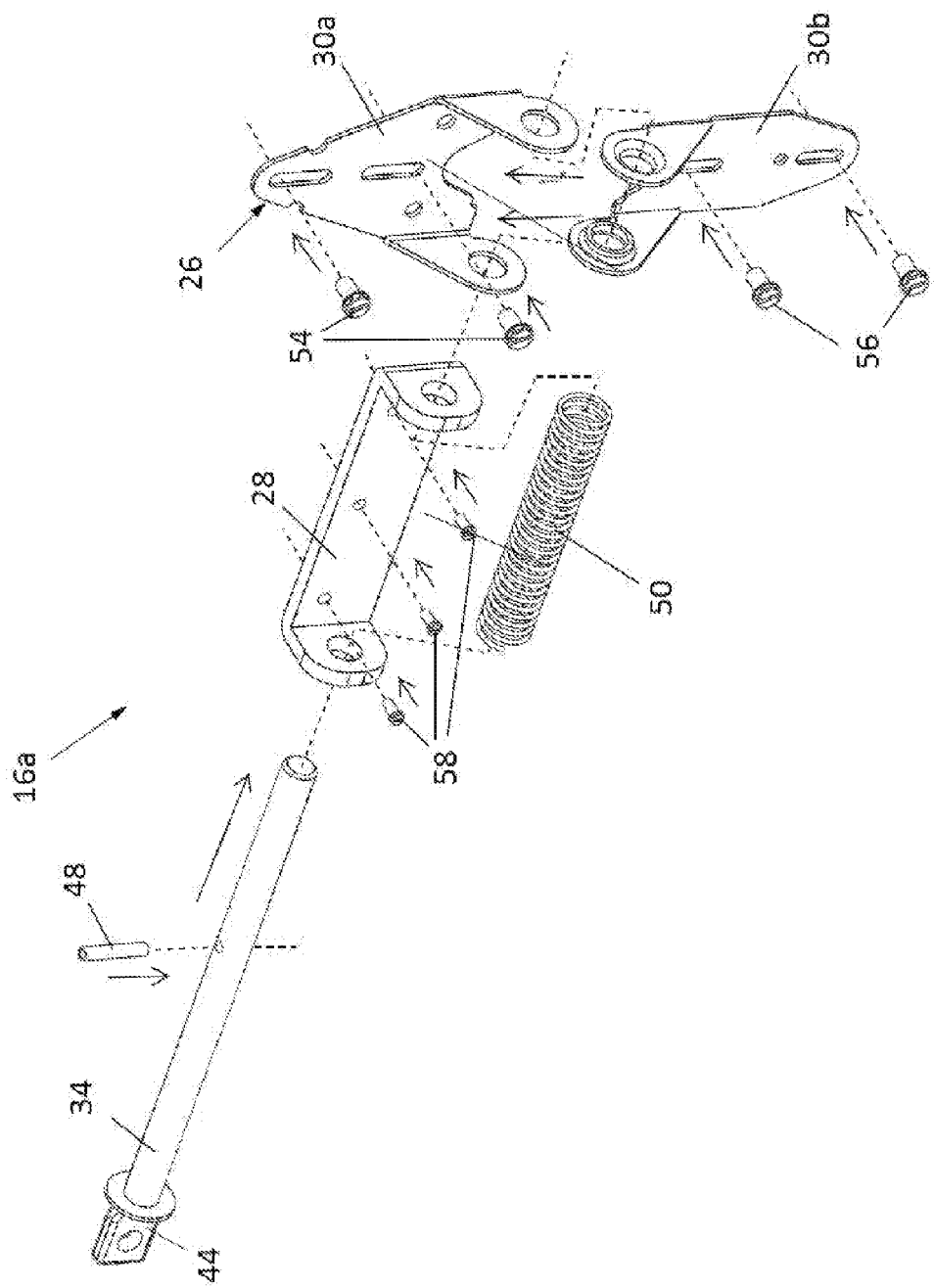

In the embodiment shown in FIGS. 2A and 2B by example, the pin 34 comprises a control end 44, having an opening 46 therein. The pin may further comprise a position stop 48 configured to bear against one of the ends 42 of bracket 28. The pin 34, in one example, is spring-loaded within bracket 28 via spring 50 encircling a portion of the pin 34 passing through the bracket 28, where the spring is configured to bear against one of the bracket ends 42 and the position lock 48. To secure the embodiment of detachable connector 16a to a panel of a multi-panel structure, mechanical fasteners 54, 56, 58 may be used to affix first member 30a, second member 30b and pin bracket 28, respectively. It should be appreciated that the detachable connectors 16 may be configured in one of a number of possible ways that permits detachment by having two separable members, with each member affixed to adjoining respective panels of a multi-panel system. Indeed, other possible embodiments are discussed below by example only.

Figure 3B:
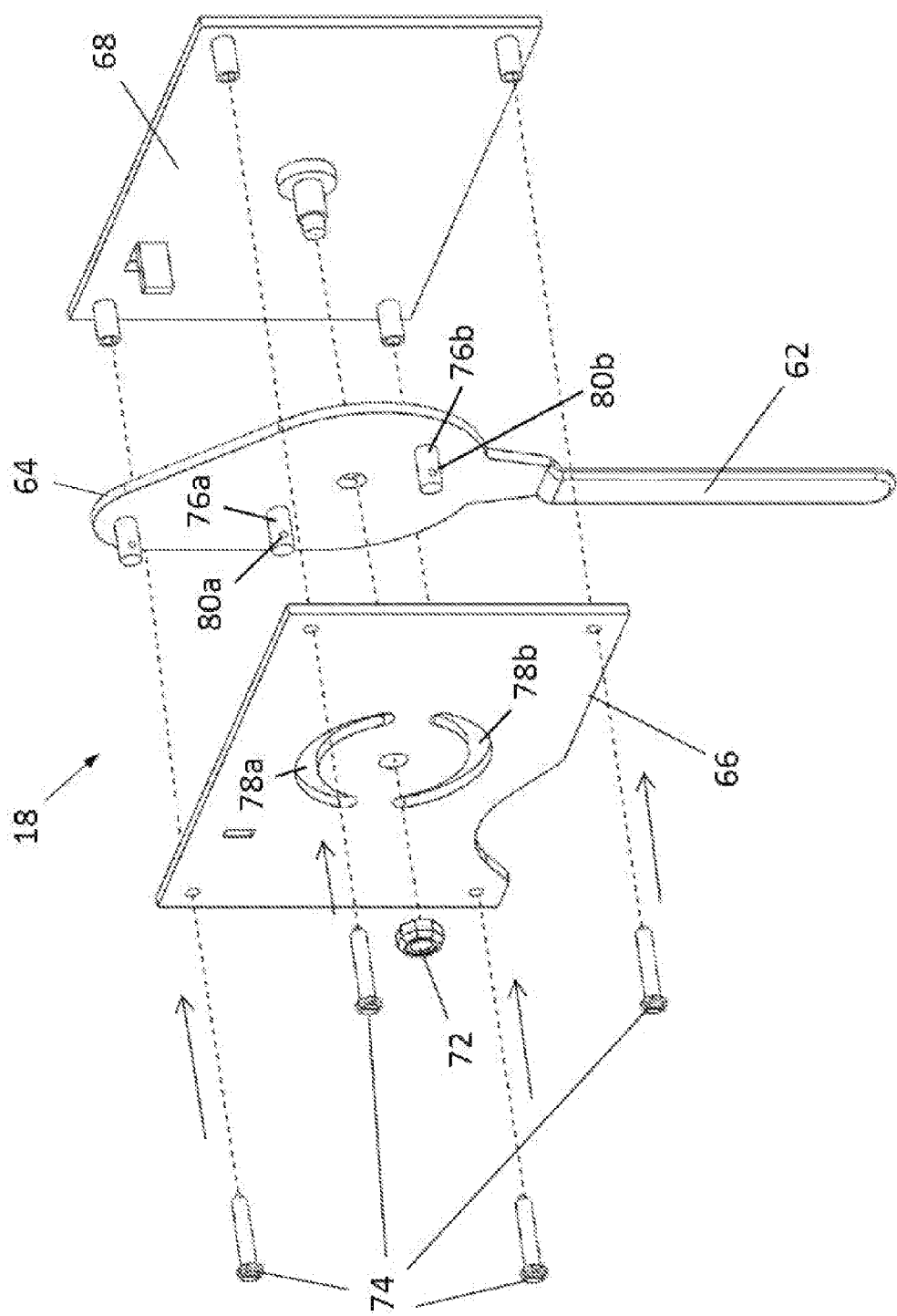

With reference to FIGS. 3A and 3B, one embodiment of an actuator may be described. In that record, by example, a mechanically-operated actuator 18 is configured to manual operation. In one such embodiment, the actuator 18 comprises a handle 62 secured to a rotatable plate 64 pivotally secured between front and back support plates 66, 68, respectively. It is contemplated that the back support would be affixed to one panel of the multi-panel system in one arrangement. The handle/plate 62/64 component is rotationally movable about secured fastener 72 where the front and back plates 66, 68 are secured to each other via mechanical fasteners 74. In one configuration, the rotatable handle plate 64 preferably comprises a plurality of pins 76a, 76b secured to the plate 64 and configured to be radially moved within one or more arcuate tracks 80a, 80b in the front plate concentric with the axis of rotation of handle plate 64 at fastener 72. By moving handle 62 radially to the left or to the right, the rotatable handle plate 64 may rotate about fastener 72 secured between front and back plates 66, 68.

Figure 4A:
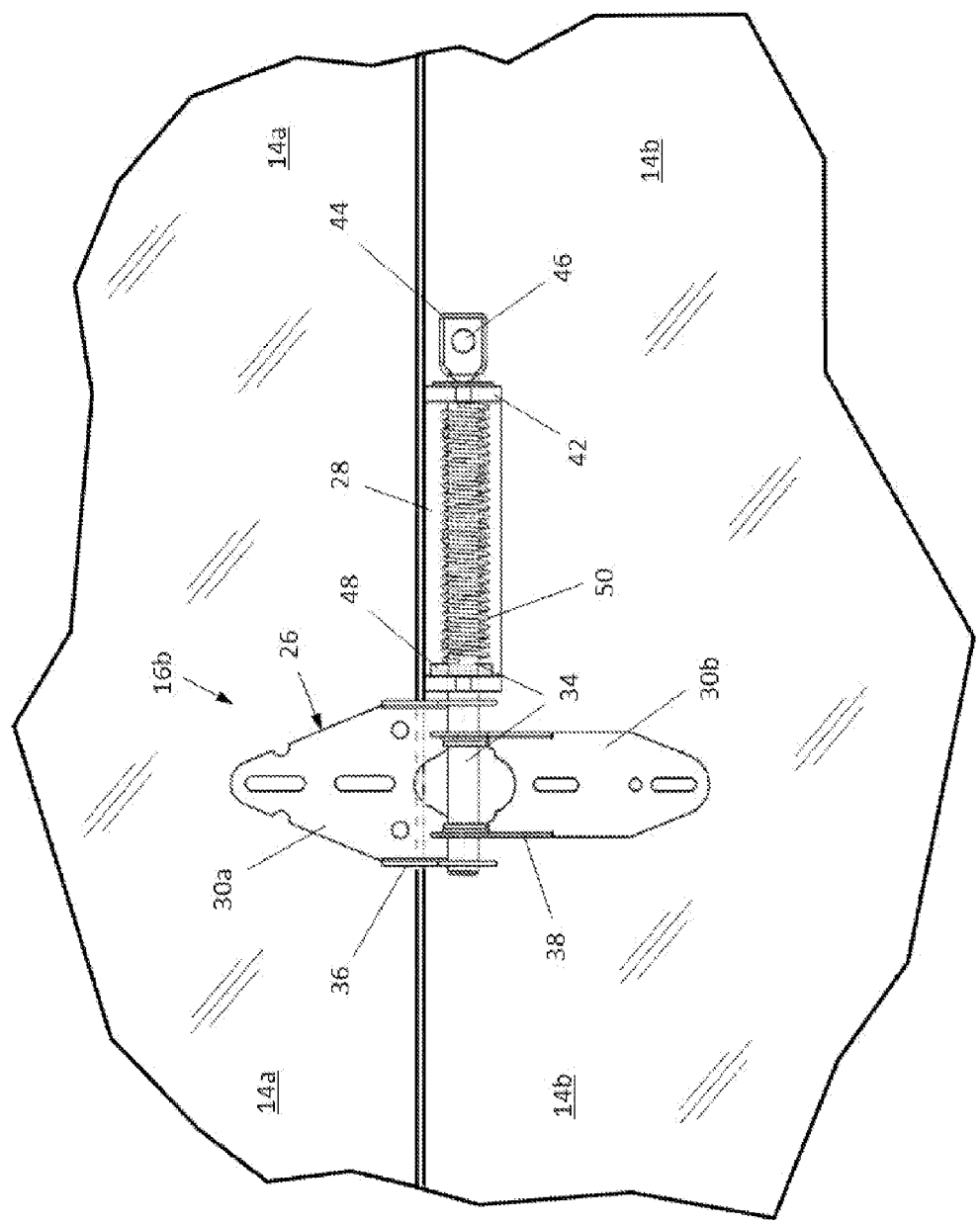
FIG. 4A shows an elevational view of one embodiment of a first connector as applied to a first and second panel of a multi-panel structure.
Figure 4B:
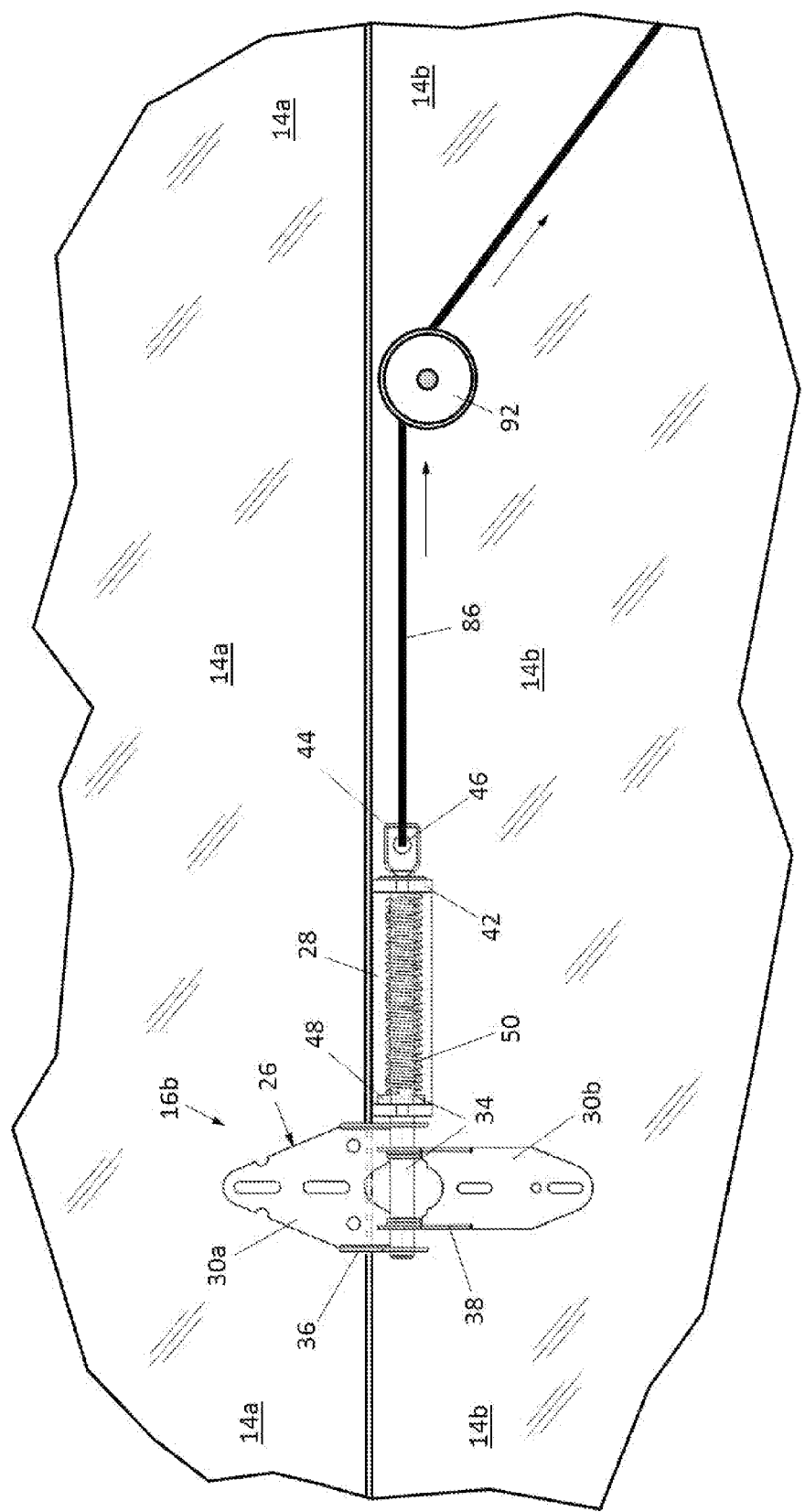

In one embodiment of actuator system, cables are secured to the pins 76a, 76b (or to alternative positions on the handle plate 64) so that movement of the handle pulls on cables to actuate one or more of the pins 34 within the detachable connectors. Referring to FIG. 4A, one embodiment of detachable connector is shown affixed to two panels 14a, 14b of a multi-panel structure. As shown in FIG. 4B, the control end 44 of pin 34 may be secured to cable 86 of the actuator system via hole 44, so that when cable 86 is pulled in the direction of the arrow, the pin 34 is moved in the same direction so that the first and second members 30a, 30b become detached from each other, as shown in FIG. 4C. Depending upon the arrangement of cables and actuator system, rollers may be employed to smoothly guide linear movement of cable 86, including a first roller 92, as shown in FIG. 4B. With reference to FIG. 4C, by pulling on the pin 34 at control end 44, the spring 50 is compressed against one bracket end 42 of bracket 28, to permit return of the pin 34 to the openings in bracket 38 upon release of the tension on the cable 86 by the actuator 18. By detaching the first and second members 30a, 30b of first connector 16b, as shown in FIG. 4C, the adjoining panels 14a, 14b may be separated, as illustrated in FIG. 1B.

Figure 5:
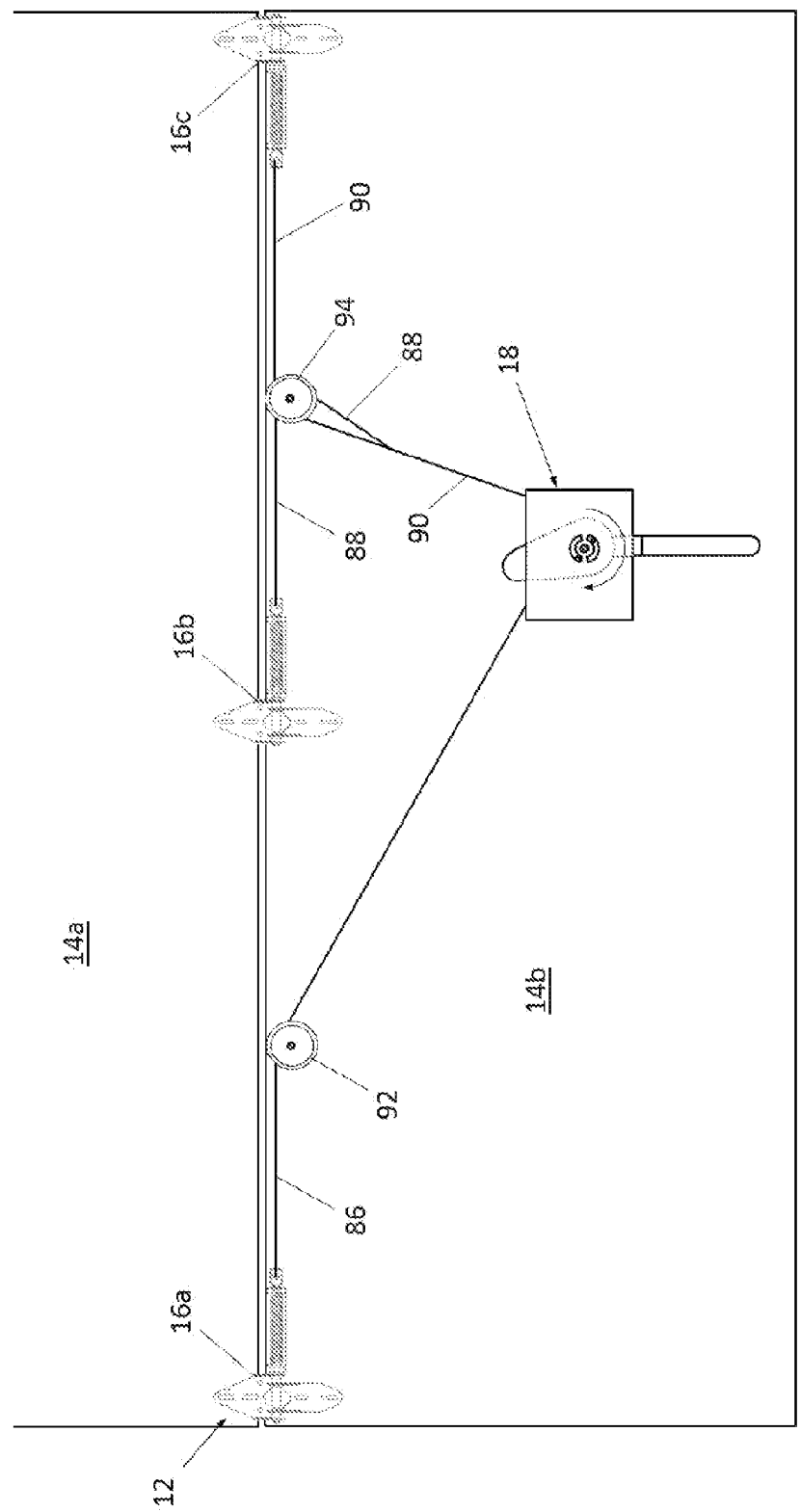
FIG. 5 shows an elevational view of one embodiment of an entire connector system including one example of detachable connectors and one example of actuator arranged in one possible configuration.

One arrangement of an actuator system 18 is shown with reference to FIG. 5, in which a single actuator 18 is configured to control simultaneously each of the plurality of detachable connectors 16a, 16b, 16c via cables 86, 88 and 90, respectively. A second roller 94 may be employed to smoothly accommodate linear movement of cables 88 and 90, where the second roller preferably comprises a double roller, one for each of the two cables, 88, 90. In such an arrangement, detachable connector 16c may be configured as a mirror image of connector 16a, where both 16a and 16c may further comprise rollers (not shown) for guiding movement of the panels 14a, 14b along tracks, such as with conventional garage doors.

Figure 6:
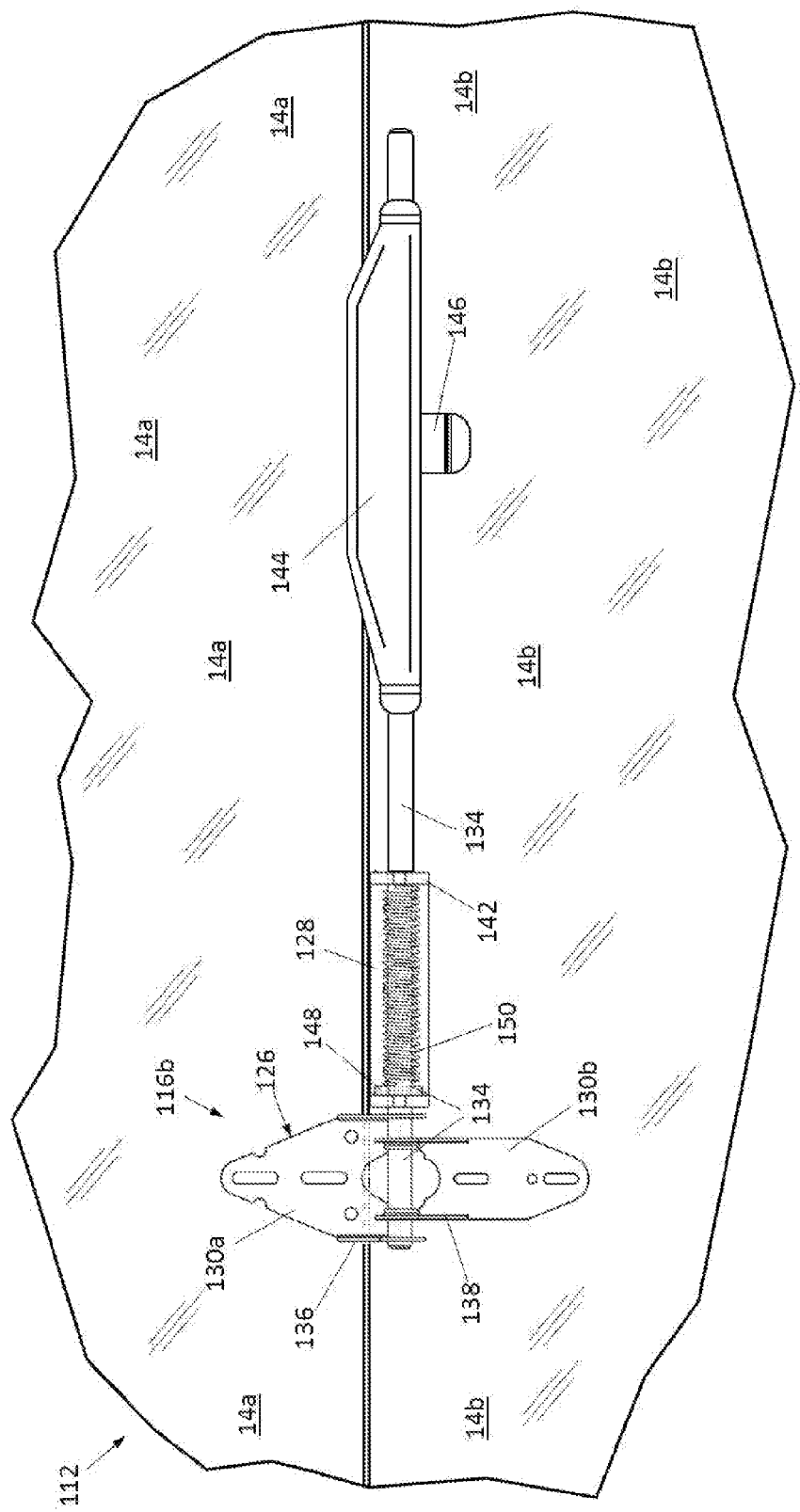
FIG. 6 shows an elevational view of an alternative embodiment of a connector system including one example of a detachable connector and another example of actuator.

In use, when it is desired to separate the adjoining panels to which the detachable connectors are affixed, the actuator is actuated, either manually or automatically, depending upon the type, configuration and arrangement of the actuator that is employed. An example of an electro-mechanical actuator is shown in FIG. 6, by example only. In that regard, connector system 112 comprises a plurality of detachable connectors, including detachable connector 116b having a configuration similar to detachable connector 16b shown and described above. But in this example of embodiment, the detachable connector 116b is linked via pin 134 to an individual actuator 144 controlled through remote operation via transceiver 146. The actuator 144 may be configured in one of numerous possible ways to controllably move pin 134 in a forward and rearward direction to detach first and second members 130a, 130b of hinge 126 of connector 116b. In other embodiments, the actuator may be controlled via hard wiring or wirelessly via a remote controller. The mechanism of action of the actuator may be electro-mechanical, mechanical, or magnetic, as well as any other system for applying a motive force to pin 134. Such actuators may be configured to independently control each detachable connector simultaneously or separately, and may be further configured to be linked to a plurality of such detachable connectors, rather than each connector be linked to its own actuator. Numerous arrangements are contemplated in that regard.

It should be noted that multi-panel structures such as those appropriate for using the connector systems described herein may be moved as a whole unit via a separate structure actuation system. In the case of a garage door, with a plurality of panels, an automated garage door having a plurality of panels typically relies upon a garage door opener that may be remotely controlled via a wireless controller. In many such cases, the garage door opener comprises a mechanical system linking at least one of the panels of the garage door to a motor and linkage, whereby actuation of the motor moves the linkage to raise or lower the multi-panel garage door as a unit. Where is desired to employ one or more embodiments of the present invention to such a multi-panel structure, an auxiliary actuation system may be required so that the panel or panels that are separated from the other panel or panels by the detachment of the detachable connectors can be moved independently of the entire set of panels normally moved as a unit. For example, with some garage systems, the linkage connects the motor of the garage door opener with the bottom-most panel of the garage door, so that the entire unit may be moved in unison upon garage door actuation. In such a situation, separation of one or more of the upper panels would not permit separation without an auxiliary actuator connected to either the panel that can be separated from those below it, or to a panel connected via undetached connector to the panel that can be separated from those below it. Such auxiliary actuator can take one or more of any numerous forms, including technology that exists today on the shelf.

Referring to FIG. 7A, an alternative embodiment of connector system 212 comprises a detachable connector 216b similarly comprising a hinge 226 and pin bracket 228, with the hinge 226 comprising first and second members 230a, 230b linked via pin 234. In this configuration, by example, the pin is not spring-biased, by rather is supported via the support bracket 228 so that control end 244 of pin 234 may be linearly controlled in a forward and rearward direction using an actuator that is configured to both pull the pin 234 to the right and to push the pin 234 back into place to the left, rather than pulling to the right via cable, and releasing the cable to permit a spring to push the pin back to its normal configuration.

Figure 7B:
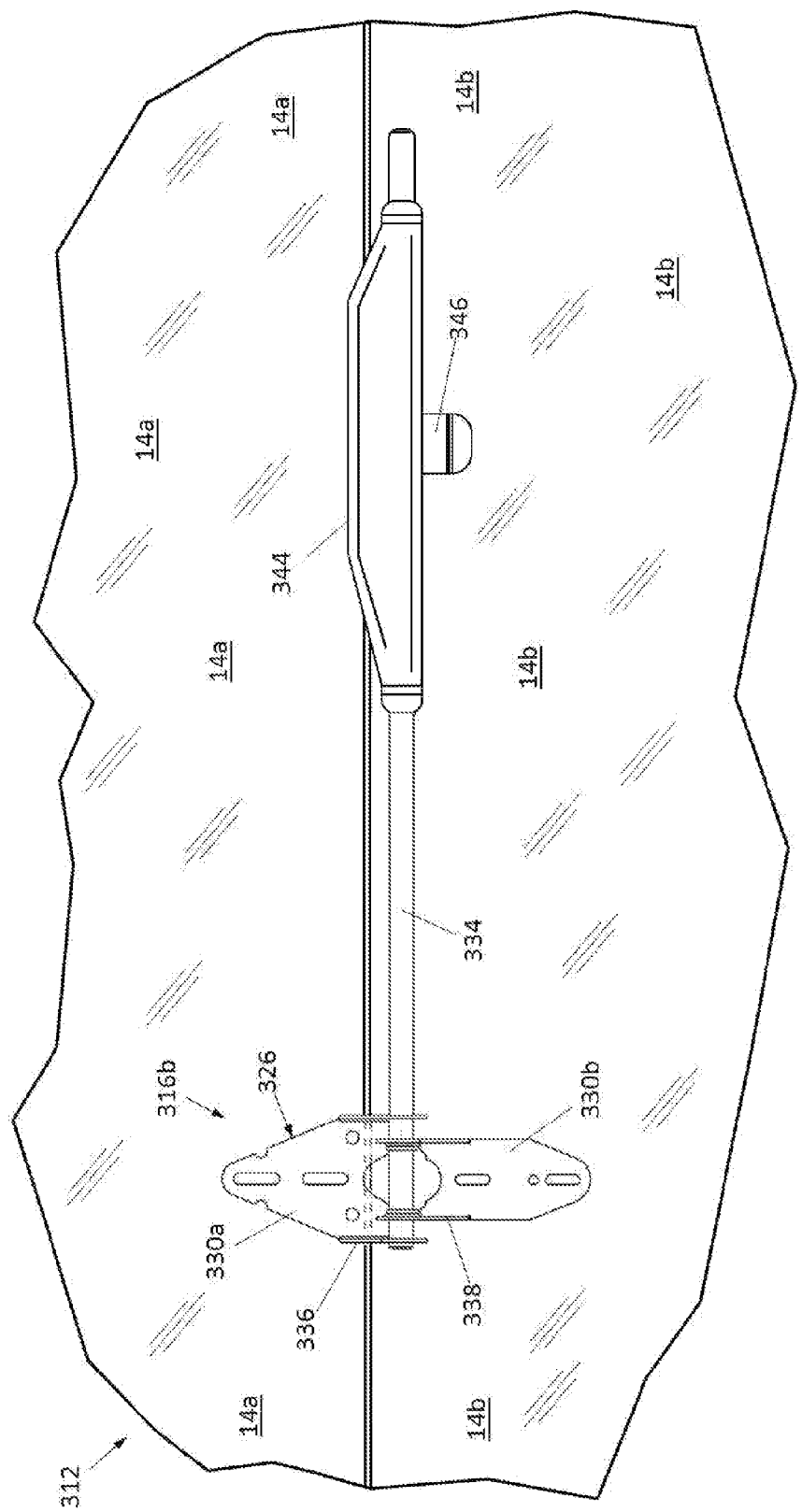
FIG. 7B shows an elevational view of yet another embodiment of a detachable connector of an alternative connector system as applied to a multi-panel structure along with another example of actuator.

Yet another configuration of detachable connector may be described with reference to FIG. 7B, where connector system 312 comprises a detachable connector 316b comprising a hinge 326 comprising first and second members 330a, 330b. The members are linked via pin 334 penetrating through brackets 336, 338 in first and second members 330a, 330b, respectively. In this embodiment, by example, pin 334 is directly associated with an automated actuator 344 controllable by one of numerous possible wired and wireless controllers, including transceiver 346 linked to a remote controller. Persons of ordinary skill in the art may appreciate that numerous other design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A connector system configured for use in disconnecting a pair of panels in a multi-panel structure when the connector system is applied to the multi-panel structure, the connector system comprising:

a plurality of first connectors having first and second members, each first member of the plurality of first connectors being configured for affixation to one end of a first panel in the multi-panel structure, each second member of the plurality of first connectors being configured for affixation to one end of a second panel that is configured to be positioned adjacent to the one end of the first panel when the multi-panel structure is in use, the first connectors comprising at least one pin bracket coupled to either one of the first or second panels and comprising a first end and a second end, the first connectors comprising at least one spring-biased pin disposed therethrough the first and second ends of the pin bracket and configured to permit relative pivotal movement of the first and second panels during normal use, the spring-biased pin further comprising a washer coupled thereto proximate a first end of the pin and positioned directly adjacent to the first end of the pin bracket, the spring-biased pin further comprising a position stop member coupled therethrough to an intermediate portion of the pin and positioned directly adjacent to the second end of the pin bracket, the spring-biased pin configured to be actuated in a linear direction by a user to detach the first connectors, thereby permitting separation of the first and second panels upon detachment of the first and second members of the first connectors; and an actuator configured to be mounted to either one of the first or second panels, the actuator being linked to the spring-biased pin in each of the first connectors, whereby actuation of the actuator causes detachment of the first and second members of the first connectors via linear movement of the pin completely away from the first and second members such that the pin is detached from the first and second members of each first connector, thereby permitting separation of the first panel from the second panel when the connector system is applied to the multi-panel structure.

2. The connector system of claim 1, wherein the actuator is manually operable.

3. The connector system of claim 1, wherein the actuator comprises:

a first support plate coupled to either one of the first or second panels;

a second support plate coupled to the first support plate and comprising at least one arcuate track; and a handle pivotably secured between the first and second support plates and comprising a support pin disposed through the at least one arcuate track, the support pin being operably connected to the spring-biased pin by a cable, wherein rotation of the handle enables the support pin to travel within the arcuate track, thereby permitting movement of the cable to actuate the spring-biased pin.

4. A multi-panel structure kit comprising the connector system of claim 1, the multi-panel structure further comprising the first and second panels each configured to accept affixation of the first and second members of the first connector of the connector system, respectively, and wherein one or both of the first and second panels is configured to accept affixation of the actuator.

5. A multi-panel structure assembly comprising the multi-panel structure claim 4, wherein the connector system is affixed to the first and second panels to permit detachable pivotable movement of the first and second panels when adjoined together using the first connector of the connector system.

6. The connector system of claim 1, wherein the actuator is automatically operable.

7. The connector system of claim 6, wherein the actuator comprises an electro-mechanical mechanism.

8. The connector system of claim 1, further comprising a plurality of second connectors having first and second members, each first member of the plurality of second connectors being configured for affixation to one end of a third panel in a multi-panel structure, each second member of the plurality of second connectors being configured for affixation to another end of the second panel when in use, the second connectors comprising at least one pin permitting relative pivotal movement of the adjacent second and third panels during normal use when the connector system is applied to the multi-panel structure, the second connectors being further configured to remain attached during normal use.

9. A multi-panel structure kit comprising the connector system of claim 8, the multi-panel structure further comprising the first panel, the second panel and a third panel, the first and second panels each configured to accept affixation of the first and second members of the first connector of the connector system, respectively, the second and third panels each configured to accept affixation of the first and second members of the second connector of the connector system, respectively, and wherein one or both of the first and second panels is configured to accept affixation of the actuator.

10. A multi-panel structure assembly comprising the multi-panel structure claim 9, wherein the connector system is affixed to the first, second and third panels to permit detachable pivotable movement of the first and second panels when adjoined together using the first connector of the connector system and to permit non-detachable pivotable movement of the second and third panels when adjoined together using the second connector of the connector system.

11. A connector system configured for use in disconnecting a pair of panels in a multi-panel structure when the connector system is applied to the multi-panel structure, the connector system comprising:
a plurality of first connectors having first and second members, each first member of the plurality of first connectors being configured for affixation to one end of a first panel in the multi-panel structure, each second member of the plurality of first connectors being configured for affixation to one end of a second panel that is configured to be positioned adjacent to the one end of the first panel when the multi-panel structure is in use, the first and second members of the first connectors comprising at least two openings to permit passage therethrough of a spring-loaded pin that, when in place, permits relative pivotal movement of the first and second panels when the first and second members are connected to such first and second panels, the first connectors comprising at least one pin bracket coupled to either one of the first or second panels and comprising a first end and a second end both configured to receive the spring-loaded pin, the spring-loaded pin further comprising a washer coupled thereto proximate a first end of the pin and positioned directly adjacent to the first end of the pin bracket, and a position stop member coupled therethrough to an intermediate portion of the pin and positioned directly adjacent to the second end of the pin bracket, wherein the first and second members of the first connectors are configured to easily detach upon actuation by a user to remove such pin from the openings; and
an actuator configured to be mounted to either one of the first or second panels, the actuator configured to control withdrawal of such pin from within the openings of each of the first and second members of the first connectors such that the pin is detached from the first and second members of each first connector, whereby actuation of the actuator causes detachment of the first and second members of the first connectors thereby permitting separation of the first panel from the second panel when the connector system is applied to the multi-panel structure.

12. The connector system of claim 11, wherein the actuator is automatically operable.

13. The connector system of claim 11, further comprising the pin configured for placement within the openings of each of the first and second members of the first connectors.

14. The connector system of claim 13, wherein the actuator comprises the pin and, thereby, upon actuation controls movement of the pin in both a forward and rearward direction through the openings of the first and second members.

15. A multi-panel structure kit comprising the connector system of claim 11, the multi-panel structure further comprising the first and second panels each configured to accept affixation of the first and second members of the first connector of the connector system, respectively, and wherein one or both of the first and second panels is configured to accept affixation of the actuator.

16. A multi-panel structure assembly comprising the multi-panel structure kit of claim 15, wherein the first connector system is affixed to the first and second panels to permit detachable pivotable movement of the first and second panels when adjoined together using the first connector of the connector system.

17. The multi-panel structure kit of claim 15 further comprising a plurality of second connectors having first and second members, each first member of the plurality of second connectors being configured for affixation to one end of a third panel in a multi-panel structure, each second member of the plurality of second connectors being configured for affixation to another end of the second panel when in use, the second connectors comprising at least one pin permitting relative pivotal movement of the adjacent second and third panels during normal use when the connector system is applied to the multi-panel structure, the second connectors being further configured to remain attached during normal use.

* * * * *